United States Patent
Scheim et al.

(10) Patent No.: US 9,386,624 B2
(45) Date of Patent: Jul. 5, 2016

(54) SYSTEMS AND METHODS OF FACILITATING PORTABLE DEVICE COMMUNICATIONS

(71) Applicant: GM GLOBAL TECHNOLOGY OPERATIONS LLC, Detroit, MI (US)

(72) Inventors: Kobi Jacob Scheim, Pardess Hanna (IL); Nadav Lavi, Ramat-Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 14/228,750

(22) Filed: Mar. 28, 2014

(65) Prior Publication Data

US 2015/0282245 A1 Oct. 1, 2015

(51) Int. Cl.
*H04W 76/04* (2009.01)
*H04W 48/10* (2009.01)
*H04W 24/02* (2009.01)
*H04W 48/16* (2009.01)
*H04W 88/04* (2009.01)

(52) U.S. Cl.
CPC ............ *H04W 76/046* (2013.01); *H04W 24/02* (2013.01); *H04W 48/10* (2013.01); *H04W 48/16* (2013.01); *H04W 88/04* (2013.01)

(58) Field of Classification Search
CPC ... H04W 76/046; H04W 48/16; H04W 88/04; H04W 48/10; H04W 84/047; H04W 40/20; H04W 40/22; H04W 52/46; H04W 4/025; H04W 52/244; H04W 24/02; H04W 76/04; H04W 4/04; H04W 4/046; H04B 1/59; H04B 7/14; H04B 7/026; H04B 7/18504; H04B 17/40; H04B 10/29; H04B 10/2918
See application file for complete search history.

(56) References Cited

U.S. PATENT DOCUMENTS

| | | | |
|---|---|---|---|
| 8,804,597 B2 * | 8/2014 | Won ................... | H04B 7/15557 370/315 |
| 8,995,956 B2 | 3/2015 | Lavi et al. | |
| 2006/0199530 A1 * | 9/2006 | Kawasaki ............ | H04B 7/2606 455/7 |
| 2007/0081479 A1 * | 4/2007 | Kang .................... | H04B 7/026 370/310 |
| 2008/0089288 A1 | 4/2008 | Anschutz et al. | |
| 2008/0148374 A1 | 6/2008 | Spaur et al. | |

(Continued)

FOREIGN PATENT DOCUMENTS

| CN | 101958747 A | 1/2011 |
|---|---|---|
| CN | 102098708 A | 6/2011 |

(Continued)

OTHER PUBLICATIONS

USPTO, Office Action for U.S. Appl. No. 14/228,759 mailed May 28, 2015.

(Continued)

*Primary Examiner* — Meless Zewdu
(74) *Attorney, Agent, or Firm* — Ingrassia Fisher & Lorenz, P.C.

(57) ABSTRACT

Methods and systems are provided for facilitating communication with a base station. The system includes a plurality of relay nodes configured to communicate wirelessly via primary communications links with the base station and transmit operational data to the base station and/or at least another of the relay nodes. At least one controller is configured to determine which of the plurality of relay nodes to place in an active state based at least partially on the operational data.

20 Claims, 3 Drawing Sheets

(56) References Cited

U.S. PATENT DOCUMENTS

| | | |
|---|---|---|
| 2009/0073946 A1 | 3/2009 | Morita |
| 2009/0296626 A1* | 12/2009 | Hottinen ............... H04B 7/155 370/315 |
| 2009/0299857 A1 | 12/2009 | Brubaker |
| 2010/0020752 A1 | 1/2010 | Anschutz et al. |
| 2010/0027419 A1 | 2/2010 | Padhye et al. |
| 2010/0250106 A1 | 9/2010 | Bai et al. |
| 2011/0092237 A1 | 4/2011 | Kato et al. |
| 2011/0181106 A1 | 7/2011 | Kim |
| 2011/0235568 A1* | 9/2011 | Esteves ............. H04B 7/15507 370/315 |
| 2011/0255481 A1 | 10/2011 | Sumcad et al. |
| 2011/0260884 A1 | 10/2011 | Yi et al. |
| 2011/0267205 A1 | 11/2011 | McClellan et al. |
| 2011/0269404 A1 | 11/2011 | Hu et al. |
| 2011/0294500 A1 | 12/2011 | Chang et al. |
| 2012/0158820 A1 | 6/2012 | Bai et al. |
| 2012/0165063 A1 | 6/2012 | Scalia et al. |
| 2012/0196528 A1 | 8/2012 | Kazmi et al. |
| 2012/0196618 A1 | 8/2012 | Lowell et al. |
| 2012/0218886 A1* | 8/2012 | Van Phan ........... H04B 7/15592 370/229 |
| 2012/0282932 A1* | 11/2012 | Yu ...................... H04W 84/005 455/437 |
| 2012/0294275 A1 | 11/2012 | Krishnaswamy et al. |
| 2012/0314576 A1 | 12/2012 | Hasegawa et al. |
| 2013/0069834 A1 | 3/2013 | Duerksen |
| 2013/0072112 A1* | 3/2013 | Gunnarsson ......... H04B 7/2606 455/9 |
| 2013/0195005 A1 | 8/2013 | Al-Shalash |
| 2013/0331093 A1* | 12/2013 | Cho ....................... H04B 7/14 455/426.1 |
| 2014/0004865 A1* | 1/2014 | Bhargava ............... B01D 46/50 455/445 |
| 2014/0049912 A1* | 2/2014 | Marshall ............. H04B 1/3877 361/692 |
| 2014/0192781 A1* | 7/2014 | Teyeb .................. H04W 36/34 370/331 |
| 2014/0293852 A1* | 10/2014 | Watanabe ......... H04W 52/0277 370/311 |
| 2014/0362688 A1 | 12/2014 | Zhang et al. |

FOREIGN PATENT DOCUMENTS

| | | |
|---|---|---|
| WO | 2012096605 A1 | 7/2012 |
| WO | 2013116981 A1 | 8/2013 |
| WO | 2015010749 A1 | 1/2015 |

OTHER PUBLICATIONS

USPTO, Response to Office Action for U.S. Appl. No. 14/228,759 mailed Jun. 25, 2015.

USPTO, Notice of Allowance and Fee(s) Due for U.S. Appl. No. 14/228,759 mailed Aug. 14, 2015.

Scheim, Kobi J., US Patent Application entitled, "Systems and Methods of Facilitating Portable Device Communications," filed on Mar. 28, 2014.

Scheim, Kobi J., US Patent Application entitled, "Methods and Apparatus for Determining and Planning Wireless Network Deployment Sufficiency When Utilizing Vehicle-Based Relay Nodes," filed on Mar. 28, 2014.

* cited by examiner

US 9,386,624 B2

SYSTEMS AND METHODS OF FACILITATING PORTABLE DEVICE COMMUNICATIONS

TECHNICAL FIELD

The technical field generally relates to radio communications, and more particularly relates to radio communications with vehicle-based repeaters.

BACKGROUND

Communication with portable cellular telephones ("portable device") is often problematic due to any number of technical and environmental factors. For instance, in urban areas, buildings often block radio frequency ("RF") signals that are emitted between the portable device and a base station, which may prevent a communications link from being established or may lead to a low quality link.

Accordingly, it is desirable to provide a system and method for providing a high quality communications link between the portable device and the base station. Furthermore, other desirable features and characteristics of the present invention will become apparent from the subsequent detailed description and the appended claims, taken in conjunction with the accompanying drawings and the foregoing technical field and background.

SUMMARY

In one embodiment, a system is provided for facilitating communication. The system includes a base station and a plurality of relay nodes. The relay nodes are configured to communicate wirelessly via primary communications links with the base station and transmit operational data to at least one of the base station and at least one other of said plurality of relay nodes. The system also includes at least one controller configured to determine which of the plurality of relay nodes to place in an active state based at least partially on the operational data.

In another embodiment, a method is provided for facilitating communications. The method includes establishing primary communications links between a base station and a plurality of relay nodes. The method also includes transmitting operational data from at least one of the plurality of relay nodes to at least one of the base station and at least another of the plurality of relay nodes. The method further includes determining which of the plurality of relay nodes to place in an active state based at least partially on the operational data.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Referring to the Figures, wherein like numerals indicate like parts throughout the several views, a system 100 and method 300 of facilitating communication are shown and described herein.

Figure 1:
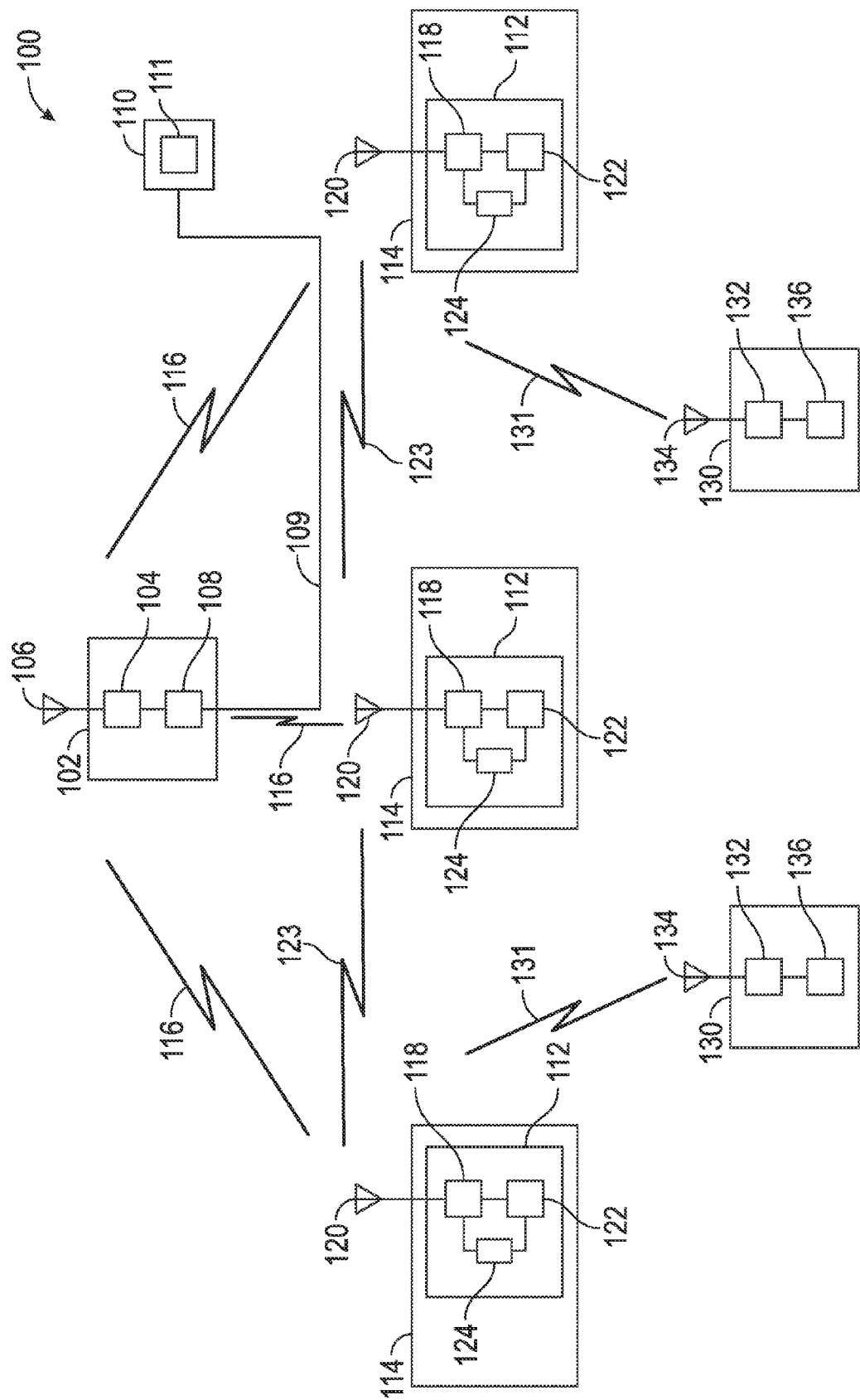
FIG. 1 is a block schematic diagram of a system for facilitating communications in accordance with one exemplary embodiment.

One exemplary embodiment of the system 100 is shown in FIG. 1. The system 100 includes a base station 102. The base station 102 of the exemplary embodiments is a wireless telephone base station having a radio 104 and an antenna 106 configured to transmit and receive radio frequency ("RF") signals. The radio 104 may alternatively be referred to as a transceiver, as is appreciated by those skilled in the art. The base station 102 also includes a controller 108 in communication with the radio 104 to control the radio 104 and transfer data there between, as is appreciated by those skilled in the art. The controller 108 may include any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The base station 102 is in communication with a telecommunications network 109 and configured to transfer data to and from the telecommunications network 109, as is also appreciated by those skilled in the art. The telecommunications network 109 may utilize wireless communications techniques (e.g., RF signals) and/or physical links (e.g., electrically conductive wire and/or fiber-optic cables). Although not shown in FIG. 1, the controller 108 may be located remotely from the base station 102 while controlling operation of the base station 102. For instance, control signals may be transmitted from a remotely located controller (not shown) via the telecommunications network 109.

A backend service 110 may be in communication with the base station 102, e.g., via the telecommunications network 109. As just one example, the backend service 110 may be the OnStar® service, offered by General Motors, headquartered in Detroit, Mich., U.S.A. The backend service 110 may include one or more controllers 111 for controlling aspects of the system 100, as explained in greater detail further below.

The system 100 also includes a plurality of relay nodes 112. The relay nodes 112 of the exemplary embodiments are each associated with a vehicle 114, such as an automobile. That is, the relay nodes 112 are supported by or carried by the vehicles 114. However, other suitable vehicles 114 may alternatively be utilized to carry the relay nodes 112, including, but not limited to, motorcycles, trains, boats, spacecraft, and aircraft. Furthermore, the relay nodes 112 need not necessarily be associated with vehicles 114.

The relay nodes 112 are configured to communicate via primary communications links 116 with the base station 102. In the exemplary embodiment shown in FIG. 1, the primary communications links 116 are implemented wirelessly utilizing RF signals. Accordingly, the relay nodes 112 each includes a first radio 118 with a first antenna 120. The first radio 118 may alternatively be referred to as a first transceiver, as is appreciated by those skilled in the art. In one embodiment, one or more of the relay nodes 112 may be configured to communicate via inter-node communication links 123 to other relay nodes 112.

The relay nodes 112 each also include a controller 122 and a battery 124. The controller 122 may include any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The battery 124 of each relay node 112 is electrically connected to the radio 118 and the controller 122 for supplying electricity to each. The battery 124 may be the same battery used to provide electricity to other systems (not shown) of the vehicle 114. Alternatively, the battery 124 may be separate from the vehicular battery.

The system 100 includes a portable communications device 130, hereafter referred to simply as a "portable device". The portable device 130 of the exemplary embodiment is a handheld device allowing a user (not shown) to communicate with voice and/or data with the relay node 112 via a secondary communications link 131. The portable device 130 may be referred to as a cellular phone, a cell phone, a smart phone, a mobile phone, a personal digital assistant, tablet, and/or a walkie-talkie. However, those skilled in the art appreciate other devices that may function as the portable communications device 130. The portable communications device 130 includes a radio 132 and an antenna 134 configured to transmit and receive RF signals via the secondary communications link 131. The radio 132 may alternatively be referred to as a transceiver, as is appreciated by those skilled in the art. The portable devices 130 may also be configured to communicate directly with the base station 102.

The portable device 130 also includes a controller 136 in communication with the radio 132. The controller 136 is configured to control the radio 132 and transfer signals and/or data there between. The controller 136 may include any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Those skilled in the art also appreciate that the radio 132, antenna 134, and/or controller 136 may be separate components or integrated with one another as a unitary component. The portable device 130 of this embodiment also includes a battery (not shown). The battery is electrically connected to the radio 132 and the controller 136 for supplying power to each.

With continued reference to FIG. 1, the controller 122 of each relay node 112 is configured to relay data between the primary communications link 116 and the secondary communications link 131. As such, the relay node 112 acts as a relay link or a "repeater" between the portable-device 130 and the base station 102.

In some embodiments, a first communications protocol associated with the primary communications links 116 is different from a second communications protocol associated with the secondary communications links 131. Also, in some embodiments, a first frequency band associated with the primary communications links 116 is different from a second frequency band associated with the secondary communications links 131.

For example, in the one exemplary embodiment, the primary communications links 116 are implemented utilizing a mobile network. For example, the primary communications links 116 are implemented utilizing frequencies and protocols associated with GSM, UMTS, and/or LTE standards. Also in this embodiment, the secondary communications links 131 are implemented utilizing Wi-Fi connections. That is, the secondary communications link 131 are implemented utilizing frequencies and protocols associated with one or more of the IEEE 802.11 family of standards. Of course, in other embodiments, the communications links 116, 131 may be implemented with any suitable frequencies and/or communications standards, including hard-wired configurations. Furthermore, it should be appreciated that the base station 102, relay nodes 112, and portable devices 130 may have more than one radio 104, 118, 132 and/or antenna 106, 120, 134 based on the desired modes and/or frequencies of operation. Although the portable devices 130 are shown in FIG. 1 as being located outside of the vehicles 114, it should be appreciated that one or more of the portable devices 130 may be located inside one or more of the vehicles 114 as well.

At least one relay node 112 is configured to transmit operational data associated with that relay node 112. In one embodiment, each relay node 112 is configured to transmit operational data. Numerous types and categories of operational data may be transmitted, as described below.

The operational data may include the location of the relay node 112. For example, the geographic location may geographic coordinates determined by a global positioning system ("GPS") receiver (not shown) in the vehicle 114. In another example, the location may be a parking spot/stall number.

The operational data may also include data associated with the battery 124 of the relay node 112. For example, a battery level, i.e., a voltage level of the battery 124, may be sensed by a voltage sensor (not shown) and included in the operational data. Other data may include, but is certainly not limited to, an installation date of the battery 124, a type of the battery 124, a minimum allowable charge of the battery 124, and the capacity of the battery 124. The operational data may include whether or not the battery 124 is being charged, e.g., when an electric or hybrid-electric vehicle 114 is plugged into a charging station (not shown).

The operational data may further include a parked state and/or parked time for the vehicle 114. The parked state refers to the vehicle 114 being in a non-driving position, e.g., when the automatic transmission is placed in park or when the parking brake is applied. The parked state may be obtained by sensors associated with the transmission and/or parking brake as is appreciated by those skilled in the art. The parked time refers to the amount of time that the vehicle has been parked.

The operational data may also include historical data such as an average parking duration in the region 200. For example, the average parking duration may be the average time that a particular vehicle 114 is parked in the region 200 during a typical day.

The operational data may also include RF metrics. For example, these RF metrics may include received signal strength indication ("RSSI"), i.e., a measurement of the power received in a radio signal. The RF metrics may also include signal-to-noise ratio ("SNR"). The RF metrics may further include potential interference from other radio transmitters. Yet another RF metric may be network conditions such as network load and/or historical network loads. These RF metrics may be obtained from the radio 118 and/or software applications associated with the radio 118. Of course, other RF metrics will be appreciated by those skilled in the art.

While it is possible to allow each relay node 112 in a geographical area to relay data, such a configuration would cause RF congestion and/or interference as well as excessive drain on batteries 124 of the relay nodes 112. The system 100 utilizes the operational data, at least in part, to determine which of the plurality of relay nodes 112 should be placed in an active state. In the active state, the relay node 112 relays data between the base station 102 via the primary communications link 116 and the portable device 130 via the secondary communications link 131. Conversely, when in an inactive state, i.e., not in the active state, the relay node 112 does not relay data.

Figure 2:
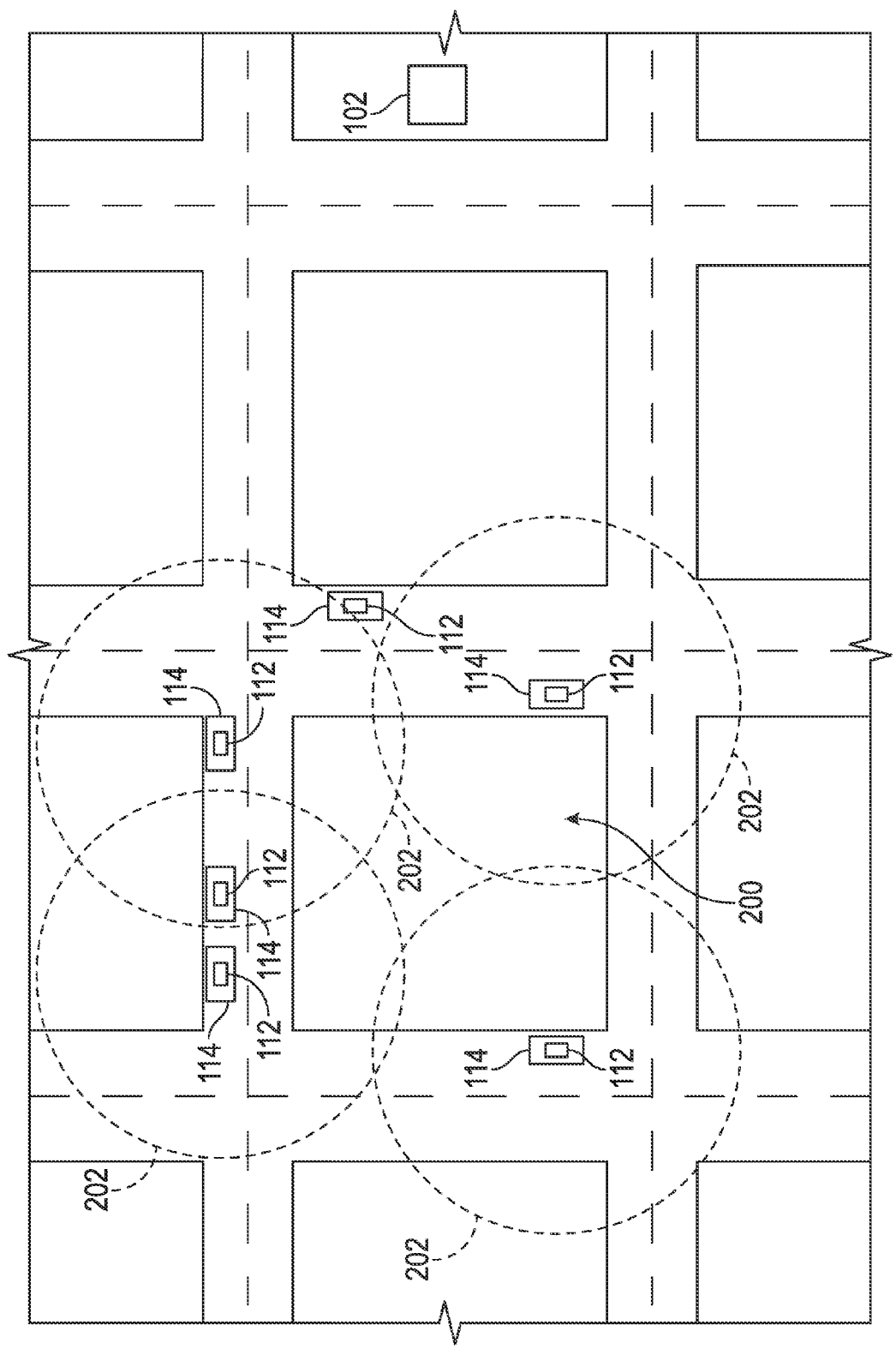
FIG. 2 is a top view of a geographical region showing a plurality of vehicles and associated relay nodes providing communications coverage to an area.

By determining which of the relay nodes 112 are to be placed in an active state, the system may provide balanced and reliable coverage of secondary communications links 131. For example, FIG. 2 presents a top view of a several city blocks (not numbered) with on-street parking for numerous vehicles 114 having relay nodes 112. While there are seven vehicles 114 shown in this figure, only four of the associated relay nodes 112 are placed in an active state to provide suitable coverage of a region 200. The dotted lines 202 indicate the coverage of the secondary communication links 131.

Referring again to FIG. 1, at least one controller 108, 111, 122 is configured to determine which of the plurality of relay nodes 112 is placed in an active state based at least partially on the operational data. For instance, in one embodiment, the controller 108 of the base station 102 may be configured to determine which of the plurality of relay nodes 112 is placed in the active state. In another embodiment, the controller 111 of the backend service 110 may receive the operational data and be configured to determine which of the plurality of relay nodes 112 to place in the active state based at least partially on the operational data. In yet another embodiment, one or more of the controllers 122 of the relay nodes 112 are configured to determine which of the plurality of relay nodes 112 to place in the active state. This may be achieved by the inter-node communication links 123, i.e., communication between the several relay nodes 112.

As alluded to above, the determination of which relay nodes 112 are placed in the active state may not be done solely based upon operational data. In one exemplary embodiment, the backend service 110 may only permit relay nodes 112 associated with certain vehicles 114 to be placed in the active state. For instance, an owner of a certain vehicle 114 may not agree to allow the relay node 112 associated with that vehicle 114 to be used in such a manner. As such, that particular relay node 112 may be excluded from entering the active state. Other factors which may be utilized to determine which relay nodes 112 are placed in the active state include, but are not limited to, loading conditions of a network, loading history of a network, the specific regions 200 in which coverage is desired, average duration of time that vehicles 114 are parked near the region 200, and the number of parking spaces near the region 200.

The disclosed methods of facilitating communications may utilize the exemplary system 100 described above. However, it is to be appreciated that the methods described herein may be implemented utilizing devices and components other than those expressly described above.

Figure 3:
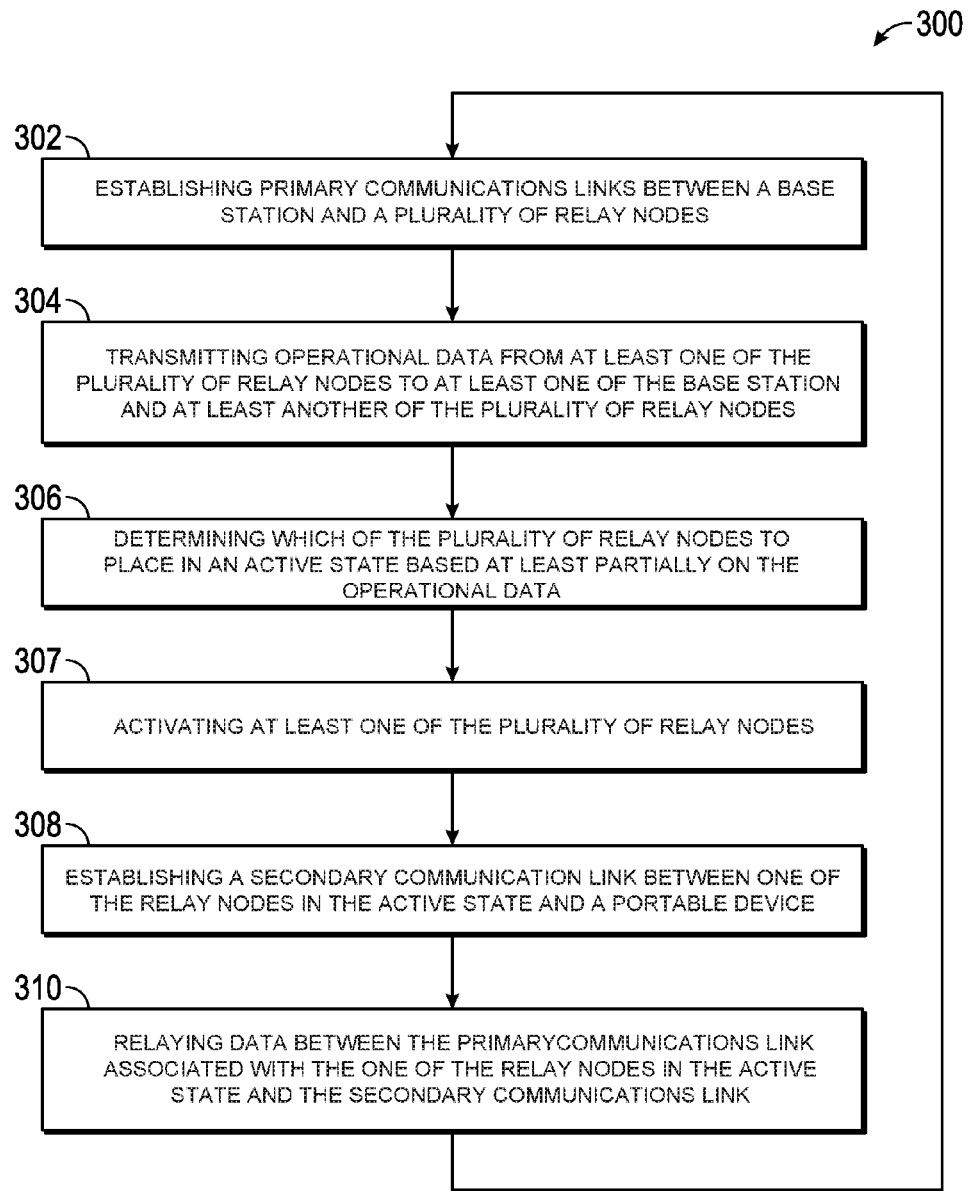
FIG. 3 is a flowchart of a method for facilitating communications in accordance with one exemplary embodiment.

Referring to FIG. 3, and with continued reference to FIGS. 1 and 2, a method 300 of facilitating communications includes, at 302, establishing primary communications links 116 between a base station 102 and a plurality of relay nodes 112. Said another way, communications are established between the base station 102 and more than one relay node 112.

The method 300 further includes, at 304, transmitting operational data from at least one of the plurality of relay nodes 112 to at least one of the base station 102 and at least another of the plurality of relay nodes 112. Said another way, the operational data may be transmitted from at least one of the relay nodes 112 to (1) the base station 102, (2) one of the relay nodes 112, and/or (3) multiple relay nodes 112. As such, the operational data may be analyzed by the base station 102, the backend service 111, and/or other relay nodes 112.

The method 300 also includes, at 306, determining which of the plurality of relay nodes 112 to place in an active state based at least partially on the operational data. As stated above, such operational data may include, but is not limited to, the location of at least one of the plurality of relay nodes 112, the battery level of at least one of the plurality of relay nodes 112, the parked time for the vehicle 114 associated with at least one of the plurality of relay nodes 112, and RF metrics of at least one of the plurality of relay nodes 112.

The method 300 may further include, at 307, activating at least one of the plurality of relay nodes 112, i.e., placing at least one of the plurality of relay nodes 112 in the active state. More specifically, in the exemplary embodiments, the plurality of relay nodes 112 that were previously determined to be placed in the active state are activated. When placed in the active state, the relay nodes 112 relay data as described in further detail below. The method 300 may also include (not shown) deactivating at least one of the plurality of relay nodes 112, e.g., the relay nodes 112 that are not determined to be placed in the active state.

The method 300 further includes, at 308, establishing a secondary communication link 131 between one of the relay nodes 112 in the active state and at least one portable device 130. The method 300 also includes, at 310, relaying data between the primary communications link 116 associated with the one of the relay nodes 112 in the active state and the secondary communications link 131. As such, a user of the portable device 130 may achieve communications with the base station 102 without having a direct connection there between.

Of course, the method 300 may be repeated periodically to evaluate changes in the operational data of the various relay nodes 112. Accordingly, relay nodes 112 that are in an active state may be changed to an inactive state, and vice-versa.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of facilitating communications with a base station, comprising:
   establishing primary communications links between the base station and a plurality of relay nodes, each of the plurality of relay nodes being disposed onboard a different respective one of a plurality of vehicles;

transmitting operational data from the plurality of relay nodes to at least one of the base station and at least another of the plurality of relay nodes, the operational data comprising, for each of the plurality of vehicles having a respective onboard relay node:
an indication of whether the vehicle is parked; and
based at least in part on the indication that the vehicle is parked, an amount of time that the vehicle has been parked;
determining which of the plurality of relay nodes to place in an active state based at least partially on the operational data, based at least in part on the amount of time for which each the plurality of vehicles having a respective onboard relay node has been parked; and
activating at least one of the plurality of relay nodes based on the determining of the relay nodes to be placed in the active state.

2. The method as set forth in claim 1, further comprising:
establishing a secondary communication link between one of the relay nodes in the active state and a portable device; and
relaying data between the primary communications link associated with the one of the relay nodes in the active state and the secondary communications link.

3. The method as set forth in claim 1, wherein:
transmitting operational data further comprises sending a location of at least one of the plurality of relay nodes; and
determining which of the plurality of relay nodes to place in the active state comprises determining which of the plurality of relay nodes to place in the active state based also at least in part on the location.

4. The method as set forth in claim 1, wherein:
transmitting operational data further comprises sending a battery level of at least one of the plurality of relay nodes; and
determining which of the plurality of relay nodes to place in the active state comprises determining which of the plurality of relay nodes to place in the active state based also at least in part on the battery level.

5. The method as set forth in claim 1, wherein:
the step of transmitting operational data further comprises sending radio frequency ("RF") metrics of at least one of the plurality of relay nodes; and
the step of determining which of the plurality of relay nodes to place in the active state comprises determining which of the plurality of relay nodes to place in the active state based also at least in part on the RF metrics.

6. The method of claim 1, wherein:
the operational data comprises, for each of the plurality of vehicles having a respective onboard relay node:
an indication of whether a transmission of the vehicle is placed in a park mode; and
based at least in part on the indication that the transmission of the vehicle is placed in the park mode, an amount of time that the transmission has been placed in the park mode; and
determining which of the plurality of relay nodes to place in the active state comprises determining which of the plurality of relay nodes to place in the active state based at least in part on the amount of time for which each of the plurality of vehicles having a respective onboard relay node has been parked with the transmission of the vehicle placed in the park mode.

7. The method of claim 1, wherein:
the operational data comprises, for each of the plurality of vehicles having a respective onboard relay node:
an indication of whether a parking brake of the vehicle has been applied; and
based at least in part on the application of the parking brake, an amount of time that the parking brake has been applied; and
determining which of the plurality of relay nodes to place in the active state comprises determining which of the plurality of relay nodes to place in the active state based at least in part on the amount of time for which the parking brake has been applied for each of the plurality of vehicles having a respective onboard relay node.

8. A system for facilitating communications with a base station, comprising:
a plurality of relay nodes configured to communicate wirelessly via primary communications links with the base station and transmit operational data to at least one of the base station and at least one other of said plurality of relay nodes, wherein:
each of the plurality of relay nodes is disposed onboard a different respective one of a plurality of vehicles; and
the operational data comprises, for each of the plurality of vehicles having a respective onboard relay node:
an indication of whether the vehicle is parked; and
based at least in part on the indication that the vehicle is parked, an amount of time that the vehicle has been parked; and
at least one controller configured to determine which of said plurality of relay nodes to place in an active state based at least partially on the operational data, based at least in part on the amount of time for which each of the plurality of vehicles having a respective onboard relay node has been parked.

9. The system as set forth in claim 8, further comprising a portable device configured to communicate wirelessly via a secondary communications link with at least one of said plurality of relay nodes in the active state, wherein at least one of said relay nodes in the active state is configured to relay data between the primary communications link and the secondary communications link.

10. The system as set forth in claim 8, wherein:
the operational data comprises a location of at least one of the plurality of relay nodes; and
the controller is configured to determine which of said plurality of relay nodes to place in the active state based also at least in part on the location.

11. The system as set forth in claim 8, wherein:
the operational data comprises a battery level of at least one of the plurality of relay nodes; and
the controller is configured to determine which of said plurality of relay nodes to place in the active state based at least in part on:
the amount of time for which each of the plurality of vehicles having a respective onboard relay node has been parked; and
the battery level.

12. The system as set forth in claim 8, wherein:
the operational data comprises RF metrics of at least one of the plurality of relay nodes, and the controller is configured to determine which of said plurality of relay nodes to place in the active state based at least in part on:
the amount of time for which each of the plurality of vehicles having a respective onboard relay node has been parked; and
the RF metrics.

13. The system of claim 8, wherein:
the operational data comprises, for each of the plurality of vehicles having a respective onboard relay node:
an indication of whether a transmission of the vehicle is placed in a park mode; and
based at least in part on the transmission in the park mode, an amount of time that the transmission has been placed in the park mode; and
the at least one controller is configured to determine which of said plurality of relay nodes to place in the active state based at least in part on the amount of time for which each of the plurality of vehicles having a respective onboard relay node has been parked with the transmission of the vehicle placed in the park mode.

14. The system of claim 8, wherein:
the operational data comprises, for each of the plurality of vehicles having a respective onboard relay node:
an indication of whether a parking brake of the vehicle has been applied; and
based at least in part on the application of the parking brake, an amount of time that the parking brake has been applied; and
the at least one controller is configured to determine which of said plurality of relay nodes to place in the active state based at least in part on the amount of time for which the parking brake has been applied for each of the plurality of vehicles having a respective onboard relay node.

15. A vehicle comprising:
a battery;
a relay node electrically connected to said battery for receiving electricity from said battery, said relay node including:
at least one antenna;
at least one radio electrically connected to said at least one antenna; and
a controller in communication with said at least one radio and configured to communicate via a primary communications link with a base station and transmit operational data related to said relay node to the base station, the operational data comprising:
an indication of whether the vehicle is parked; and
based at least in part on the indication that the vehicle is parked, an amount of time that the vehicle has been parked;
wherein the relay node is controlled at least in part based on the amount of time that the vehicle has been parked.

16. The vehicle as set forth in claim 15, wherein said controller is further configured to receive an assignment of an active state, communicate via a secondary communications link with a portable device, and relay data between the primary communications link and the secondary communications link.

17. The vehicle as set forth in claim 15, wherein the operational data comprises a location of the vehicle, and the relay node is also controlled at least in part based on the location.

18. The vehicle as set forth in claim 15, wherein the operational data comprises a battery level of said battery, and the relay node is also controlled at least in part based on the battery level.

19. The vehicle of claim 15, wherein:
the operational data comprises:
an indication of whether a transmission of the vehicle is placed in a park mode; and
based at least in part on the transmission in the parking brake, an amount of time that the transmission has been placed in the park mode; and
the relay node is controlled at least in part based on the amount of time that the transmission has been placed in the park mode.

20. The vehicle of claim 15, wherein:
the operational data comprises:
an indication of whether a parking brake of the vehicle has been applied; and
based at least in part on the application of the parking brake, an amount of time that the parking brake has been applied; and
the relay node is controlled at least in part based on the amount of time that the parking brake has been applied.

* * * * *